United States Patent
Alkan

(10) Patent No.: US 8,335,476 B2
(45) Date of Patent: Dec. 18, 2012

(54) COMMUNICATION SYSTEM AND MAINTENANCE METHOD

(75) Inventor: Erdogan Alkan, Fayetteville, NY (US)

(73) Assignee: John Mezzalingua Associates, Inc., E. Syracuse, NY (US)

( * ) Notice: Subject to any disclaimer, the term of this patent is extended or adjusted under 35 U.S.C. 154(b) by 834 days.

(21) Appl. No.: 12/497,809

(22) Filed: Jul. 6, 2009

(65) Prior Publication Data
US 2011/0003558 A1 Jan. 6, 2011

(51) Int. Cl.
*H04B 17/00* (2006.01)
(52) U.S. Cl. ............. 455/67.14; 455/67.11; 455/67.16
(58) Field of Classification Search ........... 455/67.11, 455/67.14, 67.16
See application file for complete search history.

(56) References Cited

U.S. PATENT DOCUMENTS

| | | | |
|---|---|---|---|
| 4,962,359 A | 10/1990 | Dunsmore | |
| 5,507,010 A | 4/1996 | Ahonen | |
| 5,574,981 A | 11/1996 | Ahonen | |
| 6,785,516 B1 | 8/2004 | Blystone | |
| 6,842,614 B2 | 1/2005 | Noe | |
| 6,914,436 B2 | 7/2005 | Liu et al. | |
| 7,062,235 B2 | 6/2006 | Henriksson | |
| 7,672,645 B2* | 3/2010 | Kilpatrick et al. | 455/76 |
| 2001/0046844 A1* | 11/2001 | Oura | 455/133 |
| 2002/0072358 A1 | 6/2002 | Schneider et al. | |
| 2002/0140601 A1* | 10/2002 | Sanada et al. | 342/368 |
| 2006/0104337 A1* | 5/2006 | Johnson et al. | 375/149 |
| 2007/0116015 A1* | 5/2007 | Jones | 370/396 |
| 2008/0246548 A1* | 10/2008 | Fagg et al. | 331/132 |
| 2009/0067480 A1 | 3/2009 | Barroso | |
| 2009/0069021 A1* | 3/2009 | Barroso | 455/450 |
| 2009/0070827 A1 | 3/2009 | Barroso | |
| 2010/0327948 A1* | 12/2010 | Nisbet et al. | 327/436 |
| 2011/0065392 A1* | 3/2011 | Chung et al. | 455/67.11 |

OTHER PUBLICATIONS

PCT/US2010/040912. International Search Report and Written Opinion. Date of Mailing: Feb. 21, 2011. 9 pp.
Ashley, Bill. What SWR Does Not Show (AN100). [online]. 3 pages. [retrieved on Apr. 8, 2009]. Retrieved from the Internet< http://www.aeatechnology.com/uploads/application_notes/file_4d286eeb68_AN100%20What%20SWR%20Does%20Not%20Show.pdf>.
Ashley, Bill. When to Use Cable Null (AN101). [online]. 2 pages. [retrieved on Apr. 8, 2009]. Retrieved from the Internet< http://www.aeatechnology.com/uploads/application_notes/file_86e1a5cafc_AN101%20When%20to%20Use%20Cable%20Null.pdf>.

* cited by examiner

*Primary Examiner* — Nay A Maung
*Assistant Examiner* — Erica Fleming-Hall
(74) *Attorney, Agent, or Firm* — Schmeiser, Olsen & Watts, LLP

(57) ABSTRACT

A maintenance method and system is provided. The method includes providing a device comprising a thru state switch and condition circuits. The device is permanently connected between a feed system and an antenna. The device receives a first control signal and disables a connection between the analyzer and the antenna. The device receives additional control signals and enables conditions. The device generates altered responses of the feed system. The altered responses are associated with the conditions. The altered responses are used to normalize an analyzer and the feed system or troubleshoot a communication system.

32 Claims, 7 Drawing Sheets

COMMUNICATION SYSTEM AND MAINTENANCE METHOD

BACKGROUND OF INVENTION

1. Technical Field

The present invention relates to a method and system for performing a maintenance process associated with a communication system.

2. Related Art

A system for connecting multiple devices together typically does not provide much flexibility for detecting a malfunction and providing a solution. Accordingly, there exists a need in the art to overcome at least some of the deficiencies and limitations described herein above.

SUMMARY OF THE INVENTION

The present invention provides a maintenance method comprising: providing a first condition device comprising a first thru state switch and a first plurality of condition circuits, wherein said first condition device is permanently connected between a feed system and an antenna; receiving, by said first condition device, a first control signal; disabling, by said first thru state switch in response to said first control signal, a connection to said antenna; receiving, by said first condition device, a second control signal; enabling, by a first circuit of said first plurality of condition circuits in response to said second control signal, a first condition; generating, by said first condition device, a first altered response of said feed system, wherein said first altered response is associated with said first condition; receiving, by said first condition device, a third control signal; disabling, by said first circuit of said first plurality of condition circuits in response to said receiving said third control signal, said first condition; after said disabling said first condition, enabling by a second circuit of said first plurality of condition circuits, a second condition differing from said first condition; generating, by said first condition device, a second altered response of said feed system, wherein said second altered response is associated with said second condition; receiving, by said first condition device, a fourth control signal; disabling, by said second circuit of said first plurality of condition circuits in response to said receiving said fourth control signal, said second condition; after said disabling said second condition, enabling by a third circuit of said first plurality of condition circuits, a third condition differing from said first condition and said second condition; and generating, by said first condition device, a third altered response of said feed system, wherein said third altered response is associated with said third condition, wherein said first altered response, said second altered response, and said third altered response in combination are used to normalize an analyzer and said feed system, and wherein said analyzer is connected to said feed system.

The present invention provides a communication system troubleshooting method comprising: providing a first condition device comprising a first thru state switch and a first plurality of condition circuits, wherein said first condition device is permanently connected between a feed system and an antenna; receiving, by said first condition device, a first control signal; disabling, by said first thru state switch in response to said first control signal, a connection to said antenna; receiving, by said first condition device, a second control signal; enabling, by a first circuit of said first plurality of condition circuits in response to said second control signal, a first condition; generating, by said first condition device, a first altered response of said feed system, wherein said first altered response is associated with said first condition; and troubleshooting said communication system using said first altered response.

The present invention provides a communication system comprising: an analyzer; an antenna; a feed system connected to said analyzer; and a first condition device permanently connected between said feed system and said antenna, wherein said first condition device comprises a first thru state switch and a first plurality of condition circuits, wherein said first condition device is configured to receive a first control signal, disable a connection between said analyzer and said antenna, receive a second control signal, enable a first condition, and generate a first altered response of said feed system, and wherein said first altered response is used to normalize said analyzer and said feed system or troubleshoot said communication system.

The present invention advantageously provides more flexibility in the detection of a malfunction and providing a solution in a system for connecting multiple devices together.

BRIEF DESCRIPTION OF THE DRAWINGS

FIG. 5 which includes

DETAILED DESCRIPTION OF THE INVENTION

Figure 1:
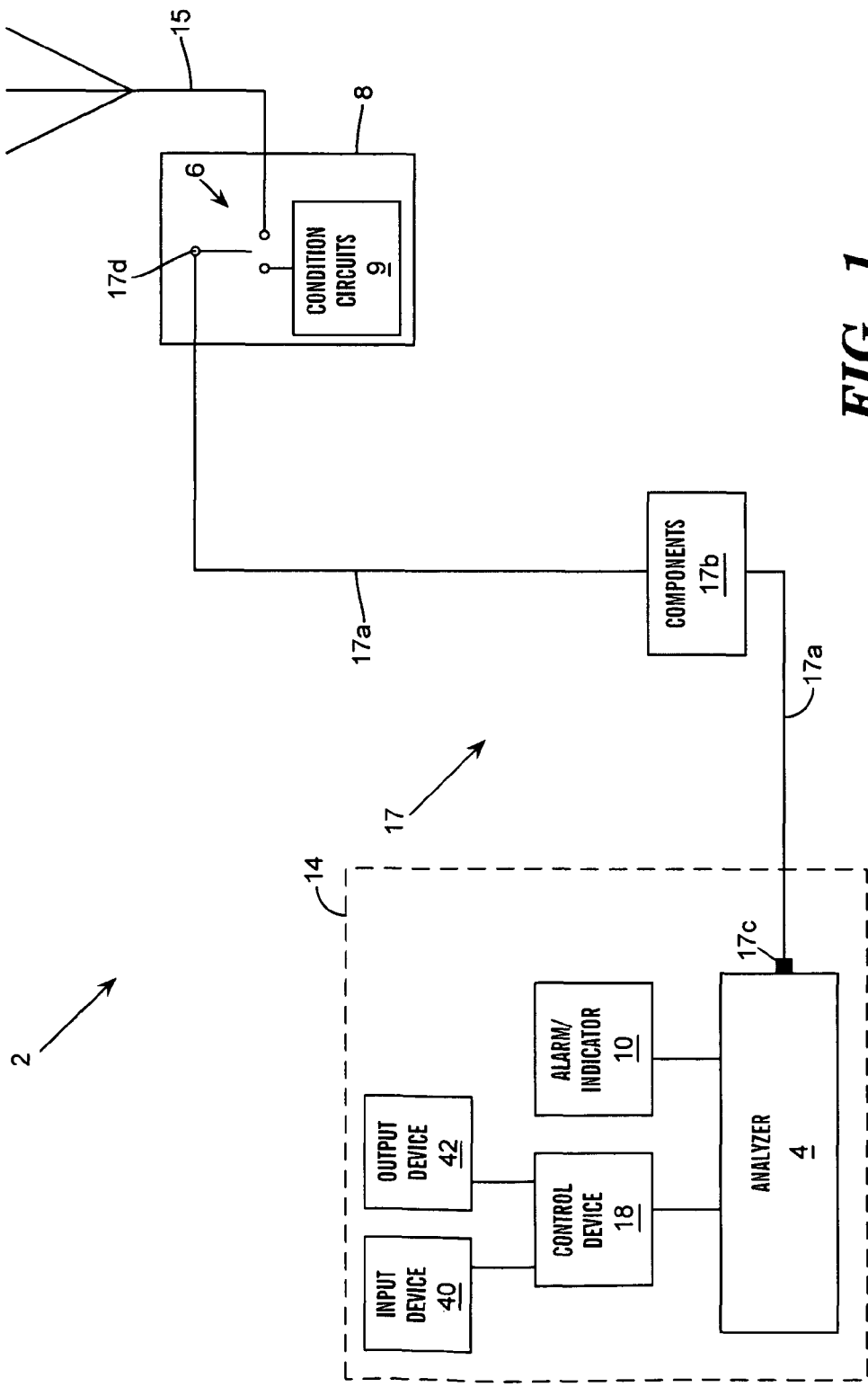
FIG. 1 depicts a block diagram of a communication system, in accordance with embodiments of the present invention.

FIG. 1 depicts a block diagram of a communication system 2, in accordance with embodiments of the present invention. Communication system 2 is configured such that a maintenance process (i.e., calibration process, troubleshooting process, and/or an antenna alignment process) may be performed. Communication system 2 comprises an analyzer 4 connected to a condition device 8 and an antenna 15 thru a feed system 17. System 2 may additionally comprise a control device 18 and an alarm/indicator 10 connected to analyzer 4. Control device 18 and alarm/indicator 10 may be located external to analyzer 4 (i.e., as illustrated in FIG. 1) or internal to analyzer 4. Analyzer 4 may comprise, among other things, a network analyzer, a frequency domain reflectometry (FDR) analyzer, a time domain reflectometry (TDR) analyzer, etc. Control device 18, alarm/indicator 10, and analyzer 4 may be located within a radio room 14 at the base of an antenna tower 20. Condition device 8 may be located in any location including, among other things, on a radio antenna tower, under water, on a satellite, on a space vessel, on a boat, on an airplane, in radio room 14, any hazardous location, any loca tion that is difficult to access, etc. Condition device 8 and antenna 15 are permanently connected to feed system 17. Condition device 8 and antenna 15 may be permanently mounted the top of a radio tower. Condition device 8 may be mounted on a radio tower during an initial installation of a radio tower and antenna 15. Antenna 15 may comprise a single antenna or a plurality of antennas. Feed system 17 comprises a feed cable 17a (e.g., coaxial cable, fiber optic cable, etc.) and optional components 17b connected in line with feed cable 17a. Optional components 17b may comprise any of the following components: surge arrestors, amplifiers, connectors, diplexers, jumper cables, etc. Individual components of optional components 17b may be located at a plurality of locations in feed line 17a. Feed line 17a comprises physical cabling that carries a radio frequency (RF) or an optical signal to and/or from antenna 15. Alternatively, feed line 17a may comprise wireless portions.

In order to perform a maintenance process (e.g., an antenna alignment process, an analyzer calibration process, a troubleshooting process associated with any components in system 2, etc), effects of components 17b of feed system 17 should be isolated. For example, a maintenance process comprises disconnecting a transmitter/receiver (i.e., not shown) from a transmitter/receiver port 17c of feed line 17a, connecting analyzer 4 to transmitter/receiver port 17c of feed line 17a, and applying calibration standards (i.e., using condition device 8) to an end 17d of feed line 17a. Calibration standards may comprise an open condition, a short condition, a load condition, and a thru condition connecting antenna 15 to feed system 17. Condition device 8 comprises condition circuits 9 for generating the calibration standards. Condition device 8 may additionally comprise a switch/switches (a radio frequency (RF) switch/switches) that is controllable from radio room 14 electrically via control device 18. Control device 18 may comprise an input device 40 for inputting user commands and an output device 42 for viewing user commands. The output device 42 may comprise any type of output device including, among other things, a liquid crystal display (LCD), a light emitting diode (LED), a cathode ray tube (CRT), etc. The input device 40 may comprise any input device including, among other things, a keypad, a keyboard, a graphical user interface, etc. A switch 6 internal to condition device 8 may be used to determine an RF path of a signal from analyzer 4. For example, switch positions may be adjusted such that an RF signal may be connected to a load condition, a short condition, an open condition, or a thru condition as illustrated in and further described with respect to FIG. 2, below. Switch 6 comprises a state that is normally closed (N/C) so that a signal path to antenna 15 is maintained until the switch 6 is activated. Switch 6 may comprise, among other things, a step motor activated switch, a relay, a solenoid switch, a contactor, a pin diode, a digital RF switch, etc. The relay may comprise any type of relay including, among other things, a mechanical relay, a solid state relay (SSR), a latching relay (mechanical or SSR), a timer relay (mechanical or SSR), etc. Control device 18 transmits (i.e., to condition device 8 upon user commands) control signals for activating switches and/or condition circuits 9 to generate the various calibration standards. Analyzer 4 may communicate with condition device 8 directly during a maintenance process. In response to control signals (i.e., from control device 18), condition device 8 generates or enables the various calibration standards and may store and/or transmit or otherwise communicate back to analyzer 4, feedback data associated with results of applying the calibration stan dards. Condition device 8 may generate or enable the various calibration standards using any method including:

1. Using a switch and multiple analog circuits internal to condition device 8 as illustrated in and described with respect to FIG. 2, further herein.
2. Receiving various signals from analyzer and/or control device 18 and activating multiple digital circuits internal to condition device 8. The digital circuits may simulate the calibration standards.

Control device 18 may transmit (i.e., to condition device 8 upon user commands) control signals to condition device 8 thru feed system 17 as an RF, digital, or optical signal. Alternatively, control device 18 may transmit (i.e., to condition device 8 upon user commands) control signals to condition device 8 wirelessly. Condition device 8 may comprise a CPU, memory device, etc. for controlling and/or storing the information associated with a state of a switch or data associated with altered responses of feed system 17. The altered responses are generated by applying the calibration standards. Condition device 8 may receive input power via feed system 17 or a dedicated power supply. Alarm/indicator 10 generates visual and/or audible alarms or indicators associated with the following:

1. Generating and transmitting control signal;
2. Receiving data associated with altered responses of feed system 17; and/or
3. Any malfunctions occurring in system 2.

Visual alarms or indicators may comprise, among other things, a single indicator or multiple indicators such as, among other things, a digital display (e.g., a liquid crystal display (LCD)), a light emitting diode (LED) display, an analog display (e.g., a gauge needle, etc). Audible alarms or indicators may comprise, among other things, an amplifier and a speaker.

System 2 of FIG. 1 may be used to perform the following maintenance process:

1. Control device 18 (upon a user command) transmits control signals to condition device 8.
2. In response to the control signals, condition device 8 disables a connection between analyzer 4 and antenna 15 and enables the various calibration standards.
3. Condition device 8 generates altered responses of feed system 8 in response to conditions enabled by the various calibration standards.
4. Analyzer 4 and feed system 17 is normalized and/or a troubleshooting process associated with system 2 is executed using the altered responses of feed system 8. Normalizing analyzer 4 and feed system 17 is defined herein as subtracting any effects (e.g., undesirable performance characteristics) of feed system 17 and/or circuits internal to analyzer 4.

Figure 2:
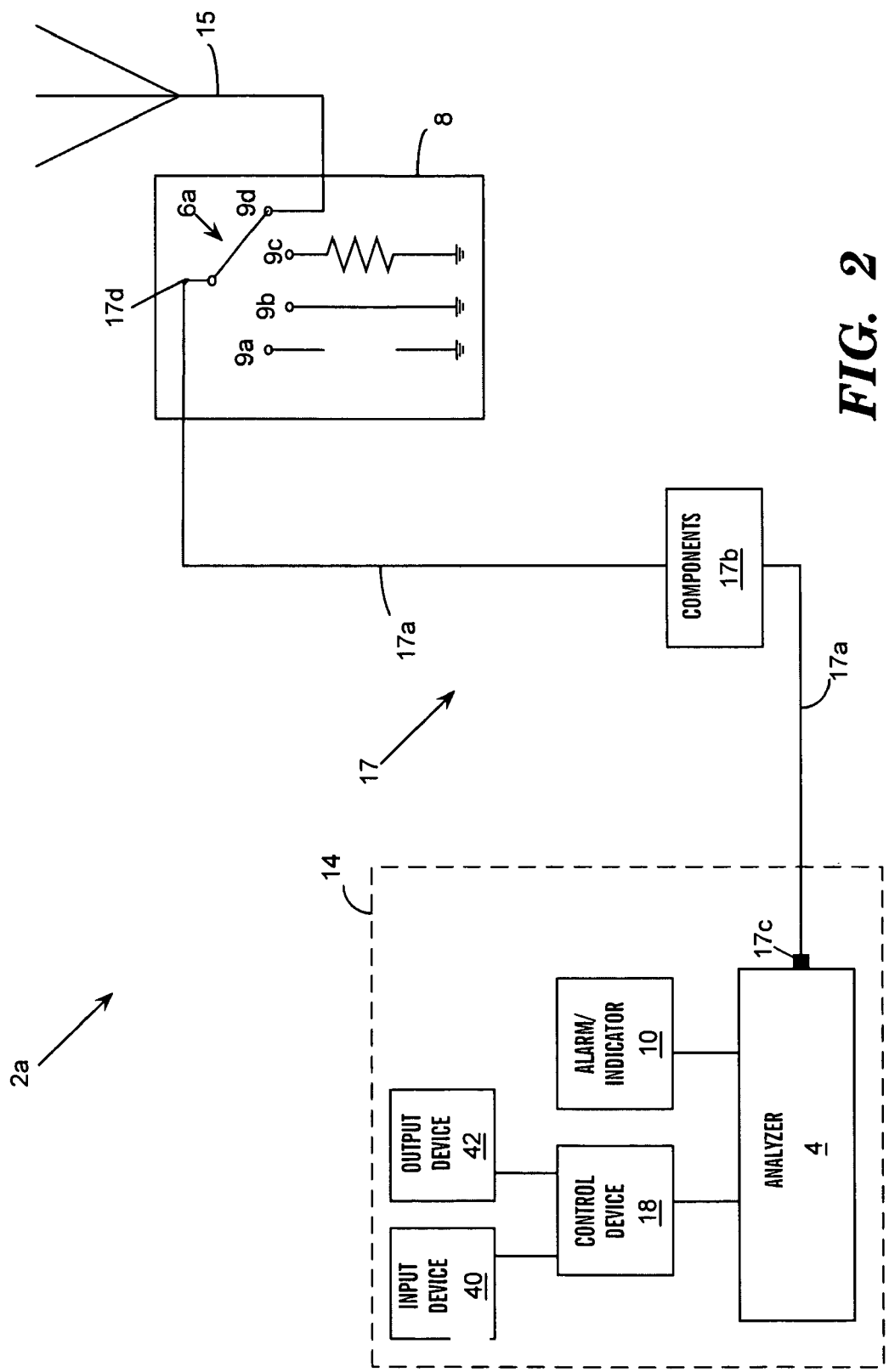
FIG. 2 illustrates a variation of FIG. 1 depicting a block diagram of a first alternative to the communication system of FIG. 1, in accordance with embodiments of the present invention.

FIG. 2 illustrates a first variation of FIG. 1 depicting a block diagram of a communication system 2a, in accordance with embodiments of the present invention. In contrast with system 2 of FIG. 1, system 2a of FIG. 2 comprises specified condition circuits 9a . . . 9d and a multi-contact switching device 6a. Alternatively, multi-contact switching device 6a may be a voltage/current controlled impedance device. Condition circuit 9a comprises an open circuit condition. Condition circuit 9b comprises a short circuit condition (e.g., a coaxial cable short circuit condition, a short circuit to ground condition, a component short circuit condition, etc). Condition circuit 9c comprises an impedance load circuit. The impedance load circuit may comprise a single impedance load or a plurality of different impedance loads comprising different impedance values. Condition circuit 9d comprises a thru state to antenna 15. Switching device 6a comprises a first switching device for switching analyzer 4 to condition circuit 9a comprising an open circuit condition. Switching device 6a comprises a second switching device for switching analyzer 4 to condition circuit 9b comprising a short circuit condition. Switching device 6a comprises a third switching device for switching analyzer 4 to condition circuit 9c comprising the impedance load circuit. Switching device 6a comprises a fourth switching device for switching analyzer 4 to condition circuit 9d comprising the thru state to antenna 15. Switch 6a comprises a state that is normally closed (N/C) so that a signal path to antenna 15 is maintained until the switch 6a is activated. Each of the switching devices in switch 6a may comprise, among other things, a step motor activated switch, a relay, a solenoid switch, a contactor, a pin diode, a digital RF switch, etc. Each of the switching devices in switch 6a may comprise a same type of switch (e.g., each of the switching devices comprises a relay) or a different type of switch (e.g., the first switching device comprises a relay, the second switching device comprises solenoid switch, etc).

Figure 3:
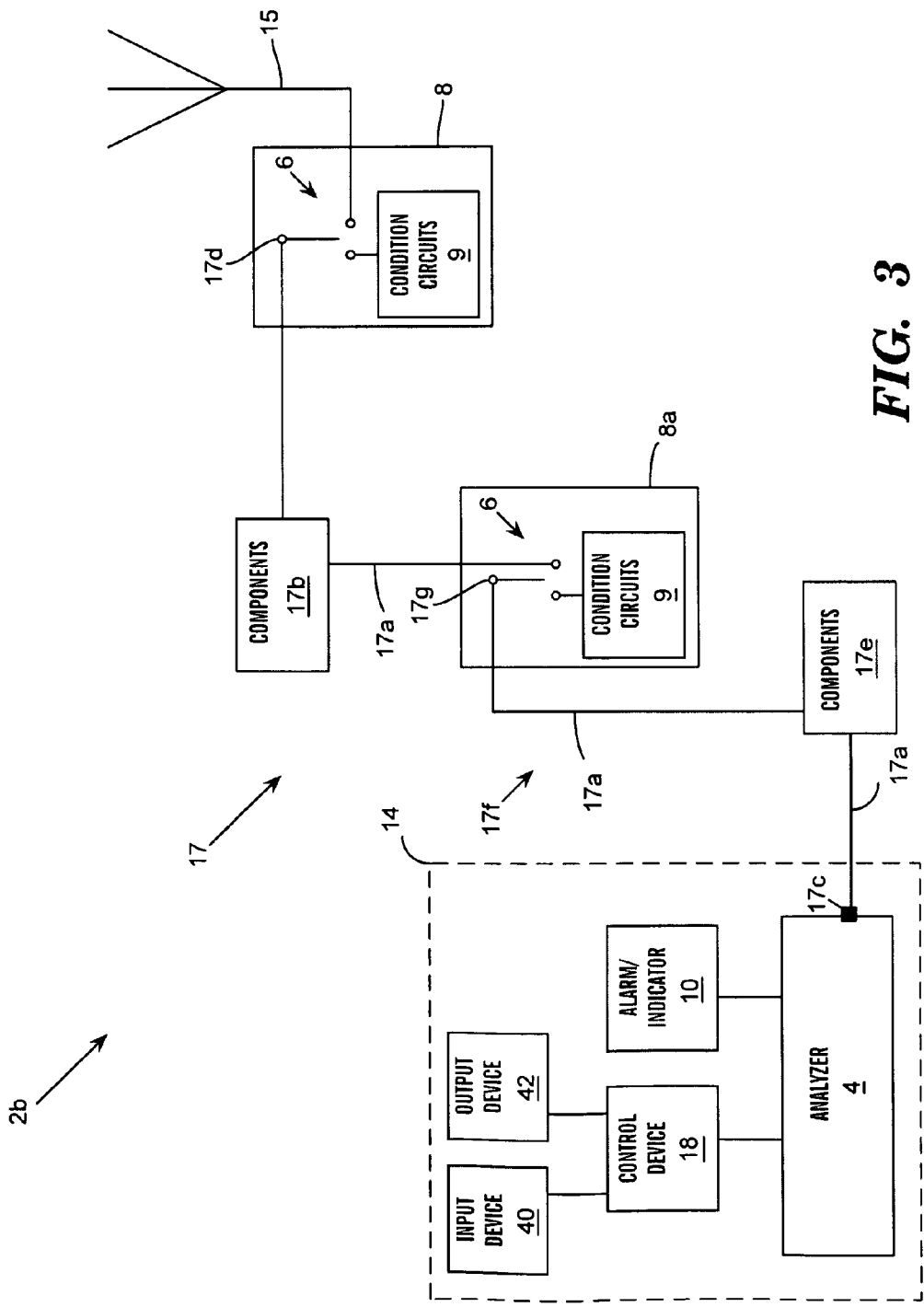
FIG. 3 illustrates a variation of FIG. 1 depicting a block diagram of a second alternative to the communication system of FIG. 1, in accordance with embodiments of the present invention.

FIG. 3 illustrates a second variation of FIG. 1 depicting a block diagram of a communication system 2b, in accordance with embodiments of the present invention. In contrast with system 2 of FIG. 1, system 2b of FIG. 3 comprises additional components 17e and an additional condition device 8a similar to condition device 8. Condition device 8a is permanently connected between components 17b and components 17e. Condition device 8a is used to perform a maintenance process associated with a portion 17f of feed system 17. Portion 17f of feed system 17 comprises components 17e and sections of feed line 17a located between condition device 8a and analyzer 4. Components 17e are connected between port 17c of feed line 17a and section 17g of feed line 17a (i.e., connected to switch 6). The maintenance process performed on portion 17f of feed system 17 comprises a same maintenance process as the maintenance process performed on the entire feed system 17 as described with respect to the description of FIG. 1, above (i.e., calibration standards are applied to section 17f of feed system 17 and altered responses associated with section 17f are used to normalize analyzer 4 and section 17f or perform a troubleshooting process associated with portions of system 2). Although FIG. 2 only comprises a single set of additional components 17e and a single additional condition device 8a, note that multiple sets of additional components (i.e., similar to additional components 17e) and multiple additional condition devices (i.e., similar to additional condition device 8a) may be implemented in system 2b of FIG. 3.

Figure 4:
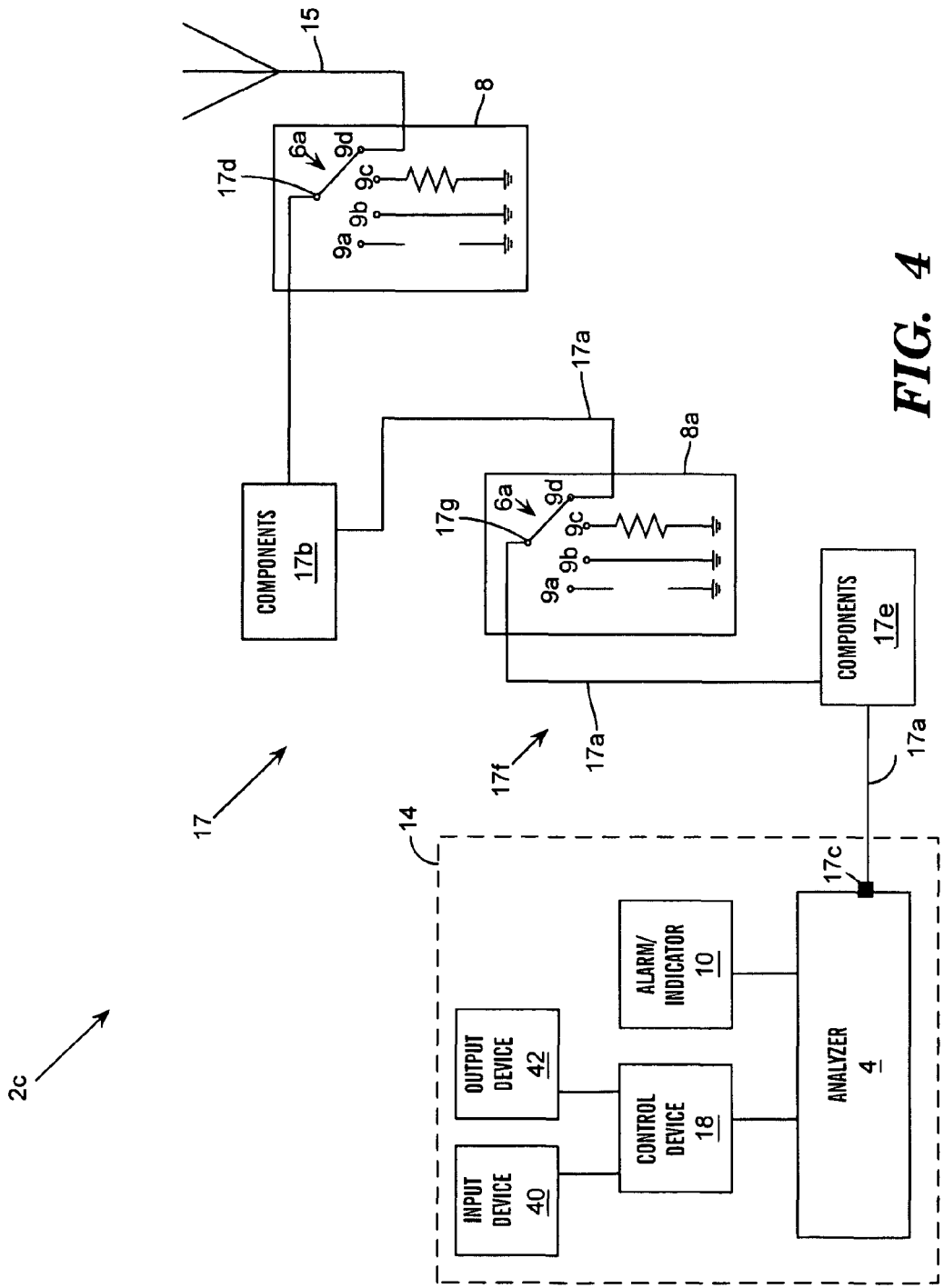
FIG. 4 illustrates a variation of FIGS. 2 and 3, in accordance with embodiments of the present invention.

FIG. 4 illustrates a variation of FIGS. 2 and 3 depicting a block diagram of a communication system 2c, in accordance with embodiments of the present invention. In contrast with system 2a of FIG. 2 and system 2b of FIG. 3, system 2c of FIG. 4 comprises additional condition device 8a comprising specified condition circuits 9a . . . 9d and multi-contact switching device 6a (i.e., similar to condition device 8 as described with respect to FIG. 2, above). System 2c is used to perform a maintenance process on portion 17f of feed system 17 that comprises a same maintenance process as the maintenance process performed on portion 17f of feed system 17 as described with respect to the description of FIG. 3, above and on the entire feed system 17 as described with respect to the description of FIG. 1, above.

Figure 5A:
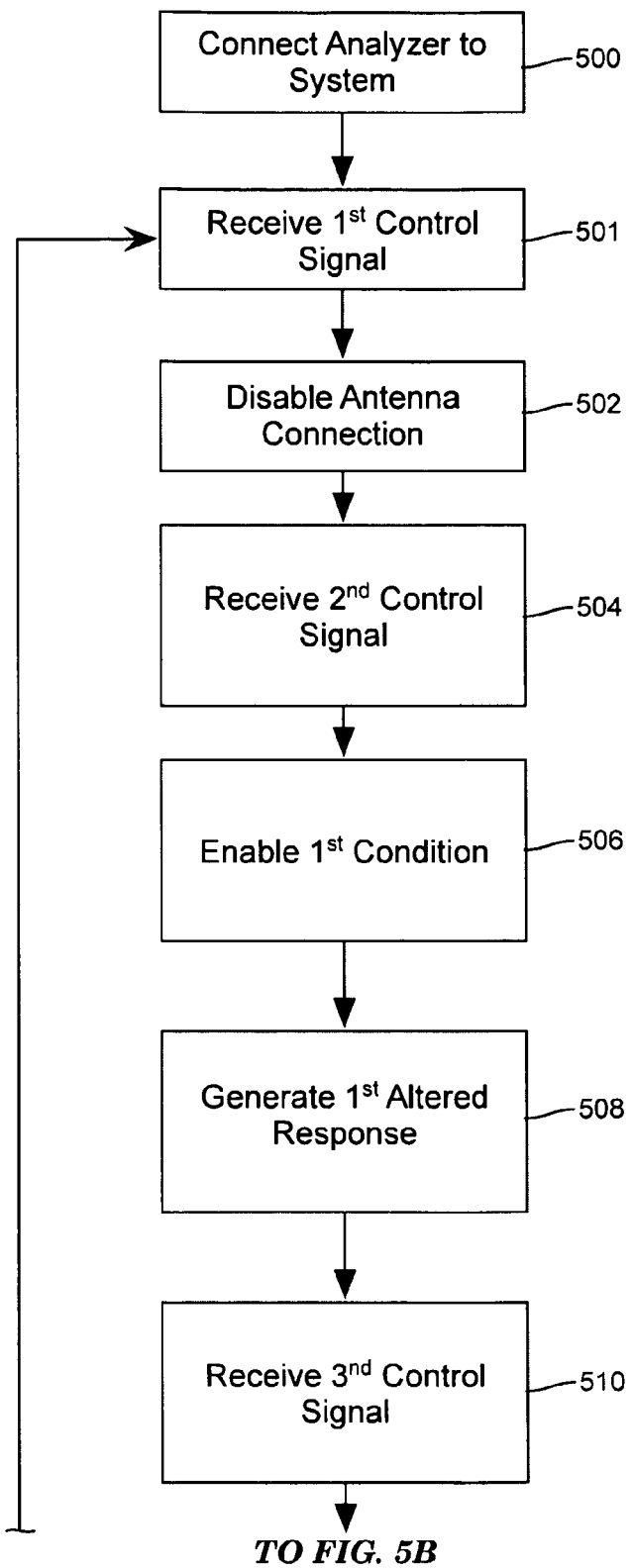
FIGS. 5A and 5B illustrates a flowchart describing an algorithm used by the systems of FIG. 1, FIG. 2, FIG. 3 and FIG. 4 for performing a maintenance process, in accordance with embodiments of the present invention.
Figure 5B:
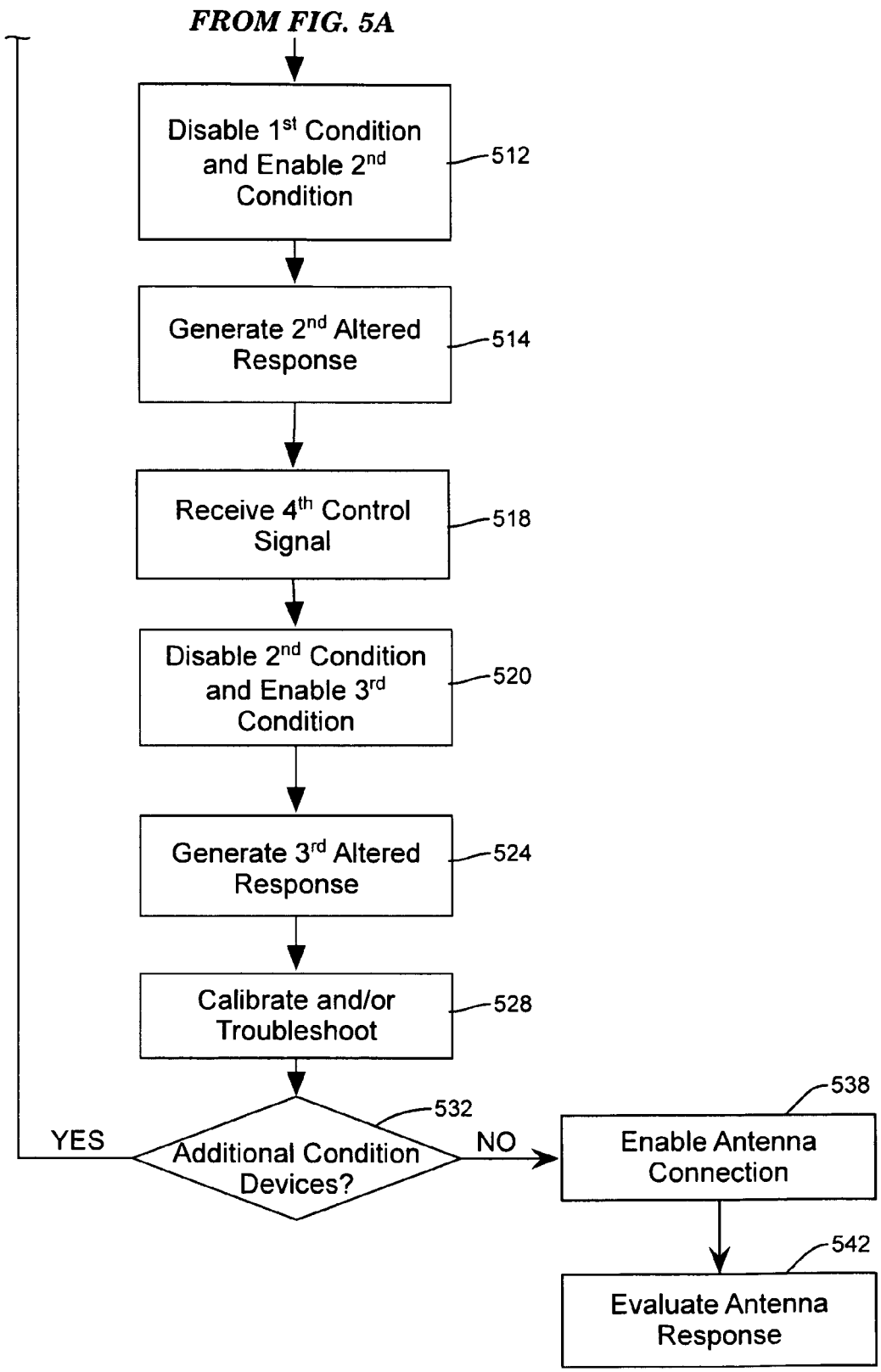

FIG. 5 which includes FIG. 5A and FIG. 5B illustrates a flowchart describing an algorithm used by system 2 of FIG. 1, system 2a of FIG. 2, system 2b of FIG. 3, and system 2c of FIG. 4 for performing a maintenance process, in accordance with embodiments of the present invention. In step 500, an analyzer (e.g., analyzer 4 of FIG. 2) is connected to a feed system (e.g., feed system 17 of FIG. 2). In step 501, a condition device (e.g., condition device 8 of FIG. 2) receives from a control device (e.g., control device 18 in FIG. 2), a first control signal. In step 502 (i.e., in response to the first control signal), the condition device disables a connection between the analyzer and an antenna (e.g., antenna 15 in FIG. 2). In step 504, the condition device receives from the control device, a second control signal. In step 506, a first condition circuit (e.g., condition circuit 9a) within the condition device enables a first condition (e.g., an open circuit condition) in response to the second control signal. In step 508, the condition device generates a first altered response of the feed system. The first altered response is associated with the first condition. In step 510, the condition device receives from the control device, a third control signal. In step 512, the first condition is disabled and a second condition circuit (e.g., condition circuit 9b) within the condition device enables a second condition (e.g., a short circuit condition) in response to the third control signal. In step 514, the condition device generates a second altered response of the feed system. The second altered response is associated with the second condition. In step 518, the condition device receives from the control device, a fourth control signal. In step 520, the second condition is disabled and a third condition circuit (e.g., condition circuit 9c) within the condition device enables a third condition (e.g., an impedance load condition) in response to the fourth control signal. In step 524, the condition device generates a third altered response of the feed system. The third altered response is associated with the third condition. In step 528, the first, second, and third altered responses are used to perform a process for normalizing the analyzer and the feed system and/or performing a process for troubleshooting components in the system. The process for troubleshooting components in the system may alternatively use a single or any combination of the first, second, and third altered responses. In step 532, it is determined if any additional condition devices exist in the system (e.g., condition device 8a illustrated and describe with respect to FIGS. 2 and 3) and if a maintenance process is to be performed on a portion of the feed system. If in step 532, it is determined that an additional condition device exists in the system and a maintenance process is to be performed on a portion of the feed system then steps 501-528 are repeated for the additional condition device. If in step 532, it is determined that an additional condition device does not exist in the system then in step 538, the antenna connection disabled in step 502 is enabled. The process for enabling the connection to the antenna includes: receiving (i.e., by the condition device) a fifth control signal, disabling (i.e., by the condition device in response to receiving the fifth control signal) the third condition, and enabling (i.e., by the condition device) the connection to the antenna. In step 542, an RF response of the antenna is evaluated.

Figure 6:
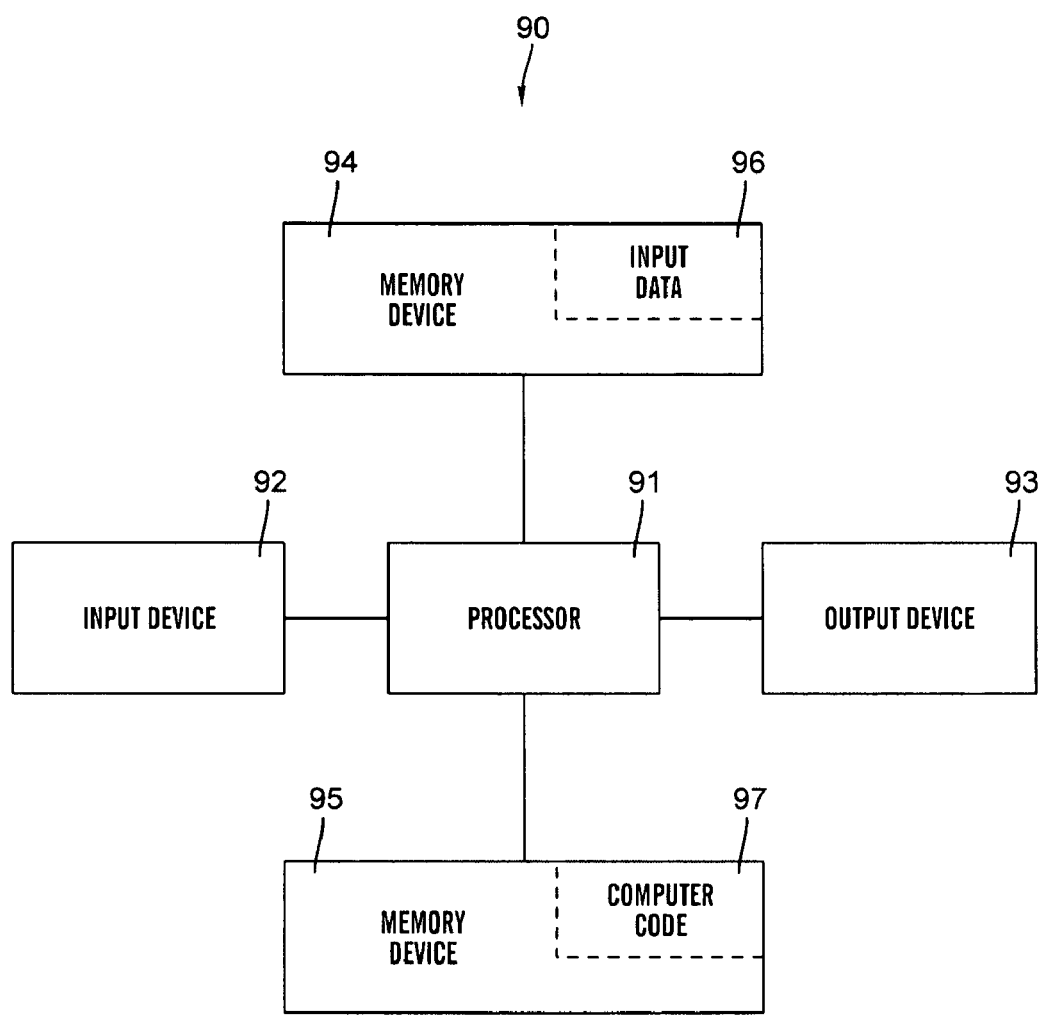
FIG. 6 illustrates a computer apparatus used for performing a maintenance process, in accordance with embodiments of the present invention.

FIG. 6 illustrates a computer apparatus 90 (examples of which may be various embodiments of condition device 8 of FIGS. 1 and 2 or condition device 8a of FIGS. 3 and 4) used for performing a maintenance process, in accordance with embodiments of the present invention. The computer system 90 may comprise a processor 91, an input device 92 coupled to the processor 91, an output device 93 coupled to the processor 91, and memory devices 94 and 95 each coupled to the processor 91. The input device 92 may be, among other things, a keyboard, a mouse, etc. The output device 93 may be, among other things, a printer, a plotter, a computer screen, a magnetic tape, a removable hard disk, a floppy disk, etc. The memory devices 94 and 95 may be, among other things, a hard disk, a floppy disk, a magnetic tape, an optical storage such as a compact disc (CD) or a digital video disc (DVD), a dynamic random access memory (DRAM), a read-only memory (ROM), etc. The memory device 95 may include a computer code 97. The computer code 97 includes algorithms (e.g., the algorithm of FIG. 5) for performing a maintenance process. The processor 91 may execute the computer code 97. The memory device 94 may include input data 96. The input data 96 includes input required by the computer code 97. The output device 93 displays output from the computer code 97. Either or both memory devices 94 and 95 (or one or more additional memory devices not shown in FIG. 6) may comprise the algorithm of FIG. 5 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

While FIG. 6 shows the computer system 90 as a particular configuration of hardware and software, any configuration of hardware and software, as would be known to a person of ordinary skill in the art, may be utilized for the purposes stated herein in conjunction with the particular computer system 90 of FIG. 6. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A maintenance method comprising:
providing a first condition device comprising a first thru state switch and a first plurality of condition circuits, wherein said first condition device is permanently connected between a feed system and an antenna;
receiving, by said first condition device, a first control signal;
disabling, by said first thru state switch in response to said first control signal, a connection to said antenna;
receiving, by said first condition device, a second control signal;
enabling, by a first circuit of said first plurality of condition circuits in response to said second control signal, a first condition;
generating, by said first condition device, a first altered response of said feed system, wherein said first altered response is associated with said first condition;
receiving, by said first condition device, a third control signal;
disabling, by said first circuit of said first plurality of condition circuits in response to said receiving said third control signal, said first condition;
after said disabling said first condition, enabling by a second circuit of said first plurality of condition circuits, a second condition differing from said first condition;
generating, by said first condition device, a second altered response of said feed system, wherein said second altered response is associated with said second condition;
receiving, by said first condition device, a fourth control signal;
disabling, by said second circuit of said first plurality of condition circuits in response to said receiving said fourth control signal, said second condition;
after said disabling said second condition, enabling by a third circuit of said first plurality of condition circuits, a third condition differing from said first condition and said second condition; and
generating, by said first condition device, a third altered response of said feed system, wherein said third altered response is associated with said third condition, wherein said first altered response, said second altered response, and said third altered response in combination are used to normalize an analyzer and said feed system, and wherein said analyzer is connected to said feed system.

2. The method of claim 1, further comprising:
receiving, by said first condition device, a fifth control signal;
disabling, by said third circuit of said first plurality of condition circuits in response to said receiving said fifth control signal, said third condition;
after said disabling said third condition, enabling by said first thru state switch in response to said fifth control signal, said connection to said antenna; and
evaluating an RF response of said antenna.

3. The method of claim 1, further comprising:
providing a second condition device comprising a second thru state switch and a second plurality of condition circuits, wherein said second condition device is permanently connected between a portion of said feed system and said first condition device;
receiving, by said first condition device, a fifth control signal;
disabling, by said third circuit of said first plurality of condition circuits in response to said receiving said fifth control signal, said third condition;
receiving, by said second condition device, a sixth control signal;
disabling, by said second thru state switch in response to said sixth control signal, a connection between said analyzer and said first condition device;
receiving, by said second condition device, a seventh control signal;
enabling, by a first circuit of said second plurality of condition circuits in response to said seventh control signal, a fourth condition;
generating, by said second condition device, a fourth altered response of said portion of said feed system, wherein said fourth altered response is associated with said fourth condition;
receiving, by said second condition device, an eighth control signal;
disabling, by said first circuit of said second plurality of condition circuits in response to said receiving said eighth control signal, said fourth condition;
after said disabling said fourth condition, enabling by a second circuit of said second plurality of condition circuits, a fifth condition differing from said fourth condition;
generating, by said second condition device, a fifth altered response of said portion of said feed system, wherein said fifth altered response is associated with said fifth condition;
receiving, by said second condition device, a ninth control signal;
disabling, by said second circuit of said second plurality of condition circuits in response to said receiving said ninth control signal, said fifth condition;
after said disabling said second condition, enabling by a third circuit of said second plurality of condition circuits, a sixth condition differing from said fifth condition and said fourth condition; and generating, by said second condition device, a sixth altered response of said portion of said feed system, wherein said sixth altered response is associated with said sixth condition, wherein said fourth altered response, said fifth altered response, and said sixth altered response in combination are used to normalize said analyzer and said portion of said feed system.

4. The method of claim 1, wherein said first circuit of said first plurality of condition circuits comprises an impedance load circuit, wherein said first condition comprises a load condition, wherein said second circuit of said first plurality of condition circuits comprises a short circuit, wherein said second condition comprises a short circuit condition, wherein said third circuit of said first plurality of condition circuits comprises an open circuit, and wherein said third condition comprises an open circuit condition.

5. The method of claim 4, wherein said first circuit of said first plurality of condition circuits comprises a first switching device switching said analyzer to said impedance load circuit, wherein said second circuit of said first plurality of condition circuits comprises a second switching device switching said analyzer to said short circuit, and wherein said third circuit of said first plurality of condition circuits comprises a third switching device switching said analyzer to said open circuit.

6. The method of claim 5, wherein each of said first switching device, said second switching device, and said third switching device comprises a same switching device selected from the group consisting of a step motor activated switch, a solid state relay, a pin diode, a digital RF switch, and a solenoid switch.

7. The method of claim 5, wherein each of said first switching device, said second switching device, and said third switching device comprises a different switching device selected from the group consisting of a step motor activated switch, a solid state relay switch, a pin diode, a digital RF switch, and a solenoid switch.

8. The method of claim 1, wherein said first control signal is received by said condition device from a control apparatus internal to said analyzer.

9. The method of claim 1, wherein said first control signal is received by said condition device from a control apparatus external to said analyzer.

10. The method of claim 1, wherein said first control signal is received wirelessly by said condition device from a control apparatus.

11. The method of claim 1, wherein said analyzer comprises an analyzer apparatus selected from the group consisting of a network analyzer, a frequency domain reflectometry analyzer, and a time domain reflectometry analyzer.

12. The method of claim 1, wherein said first condition device is permanently mounted on a radio antenna tower comprising said antenna.

13. A communication system troubleshooting method comprising:

providing a first condition device comprising a first thru state switch and a first plurality of condition circuits, wherein said first condition device is permanently connected between a feed system and an antenna;

receiving, by said first condition device, a first control signal;

disabling, by said first thru state switch in response to said first control signal, a connection to said antenna;

receiving by said first condition device, a second control signal;

enabling, by a first circuit of said first plurality of condition circuits in response to said second control signal, a first condition;

generating, by said first condition device, a first altered response of said feed system, wherein said first altered response is associated with said first condition; and troubleshooting said communication system using said first altered response;

receiving, by said first condition device, a third control signal;

disabling, by said first circuit of said first plurality of condition circuits in response to said receiving said third control signal, said first condition;

after said disabling said first condition, enabling by a second circuit of said first plurality of condition circuits, a second condition differing from said first condition;

generating, by said first condition device, a second altered response of said feed system, wherein said second altered response is associated with said second condition; and troubleshooting said communication system using said second altered response;

receiving, by said first condition device, a fourth control signal;

disabling, by said second circuit of said first plurality of condition circuits in response to said receiving said fourth control signal, said second condition;

after said disabling said second condition, enabling by a third circuit of said first plurality of condition circuits, a third condition differing from said first condition and said second condition;

generating, by said first condition device, a third altered response of said feed system, wherein said third altered response is associated with said third condition; and troubleshooting said communication system using said third altered response.

14. The method of claim 13, wherein said first circuit of said first plurality of condition circuits comprises an impedance load circuit, wherein said first condition comprises a load condition, wherein said second circuit of said first plurality of condition circuits comprises a short circuit, wherein said second condition comprises a short circuit condition, wherein said third circuit of said first plurality of condition circuits comprises an open circuit, and wherein said third condition comprises a open circuit condition.

15. The method of claim 14, wherein said first circuit of said first plurality of condition circuits comprises a first switching device switching said analyzer to said impedance load circuit, wherein said second circuit of said first plurality of condition circuits comprises a second switching device switching said analyzer to said short circuit, and wherein said third circuit of said first plurality of condition circuits comprises a third switching device switching said analyzer to said open circuit.

16. The method of claim 15, wherein each of said first switching device, said second switching device, and said third switching device comprises a same switching device selected from the group consisting of a step motor activated switch, a solid state relay, a pin diode, a digital RF switch, and a solenoid switch.

17. The method of claim 15, wherein each of said first switching device, said second switching device, and said third switching device comprises a different switching device selected from the group consisting of a step motor activated switch, a solid state relay switch, a pin diode, a digital RF switch, and a solenoid switch.

18. The method of claim 13, further comprising:
providing a second condition device comprising a second thru state switch and a second plurality of condition circuits, wherein said second condition device is permanently connected between a portion of said feed system and said first condition device;
receiving, by said first condition device, a fifth control signal;
disabling, by said third circuit of said first plurality of condition circuits in response to said receiving said fifth control signal, said third condition;
receiving, by said second condition device, a sixth control signal;
disabling, by said second thru state switch in response to said sixth control signal, a connection between said analyzer and said first condition device;
receiving, by said second condition device, a seventh control signal;
enabling, by a first circuit of said second plurality of condition circuits in response to said seventh control signal, a fourth condition;
generating, by said second condition device, a fourth altered response of said portion of said feed system; and
troubleshooting said communication system using said fourth altered response.

19. The method of claim 18, further comprising:
receiving, by said second condition device, an eighth control signal;
disabling, by said first circuit of said second plurality of condition circuits in response to said receiving said eighth control signal, said fourth condition;
after said disabling said fourth condition, enabling by a second circuit of said second plurality of condition circuits, a fifth condition differing from said fourth condition;
generating, by said second condition device, a fifth altered response of said feed system, wherein said fifth altered response is associated with said fifth condition; and
troubleshooting said communication system using said fifth altered response.

20. The method of claim 19, further comprising:
receiving, by said second condition device, a ninth control signal;
disabling, by said second circuit of said second plurality of condition circuits in response to said receiving said ninth control signal, said fifth condition;
after said disabling said fifth condition, enabling by a third circuit of said second plurality of condition circuits, a sixth condition differing from said fifth condition and said fourth condition;
generating, by said second condition device, a sixth altered response of said feed system, wherein said sixth altered response is associated with said sixth condition; and
troubleshooting said communication system using said sixth altered response.

21. The method of claim 13, wherein said first control signal is received by said condition device from a control apparatus internal to said analyzer.

22. The method of claim 13, wherein said first control signal is received by said condition device from a control apparatus external to said analyzer.

23. The method of claim 13, wherein said first control signal is received wirelessly by said condition device from a control apparatus.

24. The method of claim 13, wherein said analyzer comprises an analyzer apparatus selected from the group consisting of a network analyzer, a frequency domain reflectometry analyzer, and a time domain reflectometry analyzer.

25. The method of claim 13, wherein said wherein said condition device is permanently mounted on a radio antenna tower comprising said antenna.

26. A communication system comprising:
an analyzer;
an antenna;
a feed system connected to said analyzer;
and a first condition device permanently connected between said feed system and said antenna, wherein said first condition device comprises a first thru state switch and a first plurality of condition circuits, wherein said first condition device is configured to receive a first control signal, disable a connection between said analyzer and said antenna, receive a second control signal, enable a first condition, and generate a first altered response of said feed system, and wherein said first altered response is used to normalize said analyzer and said feed system or troubleshoot said communication system;
a second condition device permanently connected between a portion of said feed system and said first condition device, wherein said second condition device comprises a second thru state switch and a second plurality of condition circuits, wherein said second condition device is configured to receive a third control signal, disable a connection between said portion of said feed system and said first condition device, receive a fourth control signal, and enable a second condition, generate a second altered response of said feed system, and wherein said second altered response is used to normalize said analyzer and said portion of said feed system or troubleshoot said communication system.

27. The system of claim 26, wherein said analyzer comprises an analyzer apparatus selected from the group consisting of a network analyzer, a frequency domain reflectometry analyzer, and a time domain reflectometry analyzer.

28. The system of claim 26, wherein a first circuit of said first plurality of condition circuits comprises an impedance load circuit, wherein a second circuit of said first plurality of condition circuits comprises a short circuit, and wherein a third circuit of said first plurality of condition circuits comprises an open circuit.

29. The system of claim 28, wherein said first circuit of said first plurality of condition circuits comprises a first switching device switching said analyzer to said impedance load circuit, wherein said second circuit of said first plurality of condition circuits comprises a second switching device switching said analyzer to said short circuit, and wherein said third circuit of said first plurality of condition circuits comprises a third switching device switching said analyzer to said open circuit.

30. The system of claim 29, wherein each of said first switching device, said second switching device, and said third switching device comprises a same switching device selected from the group consisting of a step motor activated switch, a solid state relay, a pin diode, a digital RF switch, and a solenoid switch.

31. The system of claim 29, wherein each of said first switching device, said second switching device, and said third switching device comprises a different switching device selected from the group consisting of a step motor activated switch, a solid state relay switch, a pin diode, a digital RF switch, and a solenoid switch.

32. The system of claim 28, wherein said first condition device comprises a first switching device switching said analyzer to said impedance load circuit, said short circuit, or said open circuit.

* * * * *